(12) United States Patent
Studnicka

(10) Patent No.: US 10,430,566 B2
(45) Date of Patent: Oct. 1, 2019

(54) VEHICLE BASED ELECTRONIC AUTHENTICATION AND DEVICE MANAGEMENT

(71) Applicant: PAYPAL, INC., San Jose, CA (US)

(72) Inventor: Todd Murray Studnicka, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 63 days.

(21) Appl. No.: 15/391,546

(22) Filed: Dec. 27, 2016

(65) Prior Publication Data

US 2018/0178737 A1 Jun. 28, 2018

(51) Int. Cl.
| | | |
|---|---|---|
| *G06F 21/31* | (2013.01) | |
| *G06F 21/34* | (2013.01) | |
| *G06F 21/35* | (2013.01) | |
| *H04W 12/06* | (2009.01) | |
| *H04W 4/02* | (2018.01) | |

(52) U.S. Cl.
CPC .............. *G06F 21/31* (2013.01); *G06F 21/34* (2013.01); *G06F 21/35* (2013.01); *H04W 4/023* (2013.01); *H04W 12/06* (2013.01); *G06F 2221/2111* (2013.01)

(58) Field of Classification Search
CPC ....... H04W 12/06; H04W 4/023; G06F 21/31; G06F 2221/2111
See application file for complete search history.

(56) References Cited

U.S. PATENT DOCUMENTS

| | | | | |
|---|---|---|---|---|
| 7,610,040 | B2* | 10/2009 | Cantini | G06Q 20/04 |
| | | | | 340/5.9 |
| 9,324,002 | B2* | 4/2016 | Ryan | G06K 9/46 |
| 9,396,332 | B2* | 7/2016 | Abrams | G06F 21/554 |
| 9,521,238 | B1* | 12/2016 | Thanayankizil | H04M 1/7253 |
| 9,589,118 | B2* | 3/2017 | Agarwal | G06F 21/31 |
| 9,639,680 | B2* | 5/2017 | Chandra | G06F 21/31 |
| 9,940,615 | B2* | 4/2018 | Johnson, Jr. | G06Q 50/30 |
| 9,948,663 | B1* | 4/2018 | Wang | G06F 16/13 |
| 9,965,609 | B2* | 5/2018 | Chandra | G06F 21/31 |
| 2004/0185842 | A1* | 9/2004 | Spaur | B60R 25/04 |
| | | | | 455/420 |
| 2012/0203599 | A1* | 8/2012 | Choi | G06Q 30/02 |
| | | | | 705/13 |
| 2012/0214470 | A1* | 8/2012 | Tadayon | H04W 4/50 |
| | | | | 455/418 |
| 2012/0233246 | A1* | 9/2012 | Guemez | G06Q 40/00 |
| | | | | 709/203 |

(Continued)

*Primary Examiner* — James R Turchen
(74) *Attorney, Agent, or Firm* — Haynes and Boone, LLP

(57) ABSTRACT

Systems and methods for an authentication system include determining that a first user device is located within a vehicle, where the first user device is associated with a first user. Vehicle authentication information is received from the vehicle. A vehicle account associated with the vehicle is authenticated using the vehicle authentication information. First transportation information associated with the vehicle is received from the vehicle. A user authentication configuration is determined based on the vehicle account and the first transportation information. A user account of the first user for the first user device is authenticated based on the first transportation information according to the user authentication configuration.

20 Claims, 13 Drawing Sheets

(56) References Cited

U.S. PATENT DOCUMENTS

| | | | |
|---|---|---|---|
| 2013/0036037 A1* | 2/2013 | Meredith | G06Q 20/00 705/35 |
| 2013/0282283 A1* | 10/2013 | Bondesen | H04W 4/21 701/537 |
| 2013/0344859 A1* | 12/2013 | Abramson | H04M 1/72577 455/418 |
| 2014/0045531 A1* | 2/2014 | Kessoku | H04W 4/046 455/456.2 |
| 2014/0307655 A1* | 10/2014 | Ricci | H04W 4/21 370/329 |
| 2014/0309849 A1 | 10/2014 | Ricci | |
| 2014/0335902 A1* | 11/2014 | Guba | H04W 4/027 455/456.4 |
| 2014/0366128 A1* | 12/2014 | Venkateswaran | H04L 63/08 726/19 |
| 2015/0026047 A1* | 1/2015 | Johnson, Jr. | G06Q 50/30 705/39 |
| 2015/0073980 A1 | 3/2015 | Griffin et al. | |
| 2015/0149465 A1* | 5/2015 | Unser | G06F 16/25 707/738 |
| 2015/0227728 A1* | 8/2015 | Grigg | G06F 21/31 726/4 |
| 2015/0227926 A1* | 8/2015 | Grigg | G06Q 20/32 705/64 |
| 2015/0235477 A1* | 8/2015 | Simkin | G07B 15/02 705/417 |
| 2015/0310434 A1* | 10/2015 | Cheung | G06Q 20/12 705/44 |
| 2016/0012411 A1* | 1/2016 | Kursun | G06Q 20/3221 705/42 |
| 2016/0021238 A1* | 1/2016 | Abramson | H04W 48/04 455/418 |
| 2016/0035013 A1* | 2/2016 | Plattenburg | H04W 76/10 705/27.1 |
| 2016/0071227 A1* | 3/2016 | Shenoy | G06Q 50/30 705/13 |
| 2016/0125458 A1* | 5/2016 | Enriquez | G06Q 30/0253 705/14.27 |
| 2016/0155110 A1* | 6/2016 | Wright | G06Q 30/02 705/4 |
| 2016/0185358 A1 | 6/2016 | Todasco et al. | |
| 2016/0226847 A1* | 8/2016 | Bone | H04W 4/70 |
| 2016/0253848 A1* | 9/2016 | Taniguchi | G07B 15/02 705/13 |
| 2016/0364718 A1* | 12/2016 | Betancourt | G06Q 20/3278 |
| 2017/0127230 A1* | 5/2017 | Enriquez | G08G 1/017 |
| 2017/0134906 A1* | 5/2017 | Yoo | H04W 4/027 |
| 2017/0140376 A1* | 5/2017 | Carraway | G06Q 20/401 |
| 2017/0140381 A1* | 5/2017 | Ducrohet | G06Q 20/4014 |
| 2017/0269695 A1* | 9/2017 | Tokish | G06F 3/016 |
| 2017/0272418 A1* | 9/2017 | Kim | H04L 63/08 |
| 2017/0279957 A1* | 9/2017 | Abramson et al. | H04M 1/72577 |
| 2017/0357980 A1* | 12/2017 | Bakun | G06Q 20/40145 |
| 2018/0137437 A1* | 5/2018 | Chan | G06K 19/06037 |
| 2018/0316445 A1* | 11/2018 | Hamada | H04B 17/318 |

\* cited by examiner

VEHICLE BASED ELECTRONIC AUTHENTICATION AND DEVICE MANAGEMENT

BACKGROUND

The present disclosure generally relates to electronic authentication, and more particularly to vehicle based electronic authentication and device management that performs electronic authentication of devices and manages devices using transportation information associated with the vehicle.

More and more users are conducting electronic transactions via computing devices over electronic networks such as, for example, the Internet. Before such transactions occur, however, security measures are generally used so that electronic authorization can be performed to ensure the validity of a transaction and prevent unauthorized access to accounts or credentials.

Thus, there is a need for improvements to conventional electronic authentication and device management.

Figure 1:
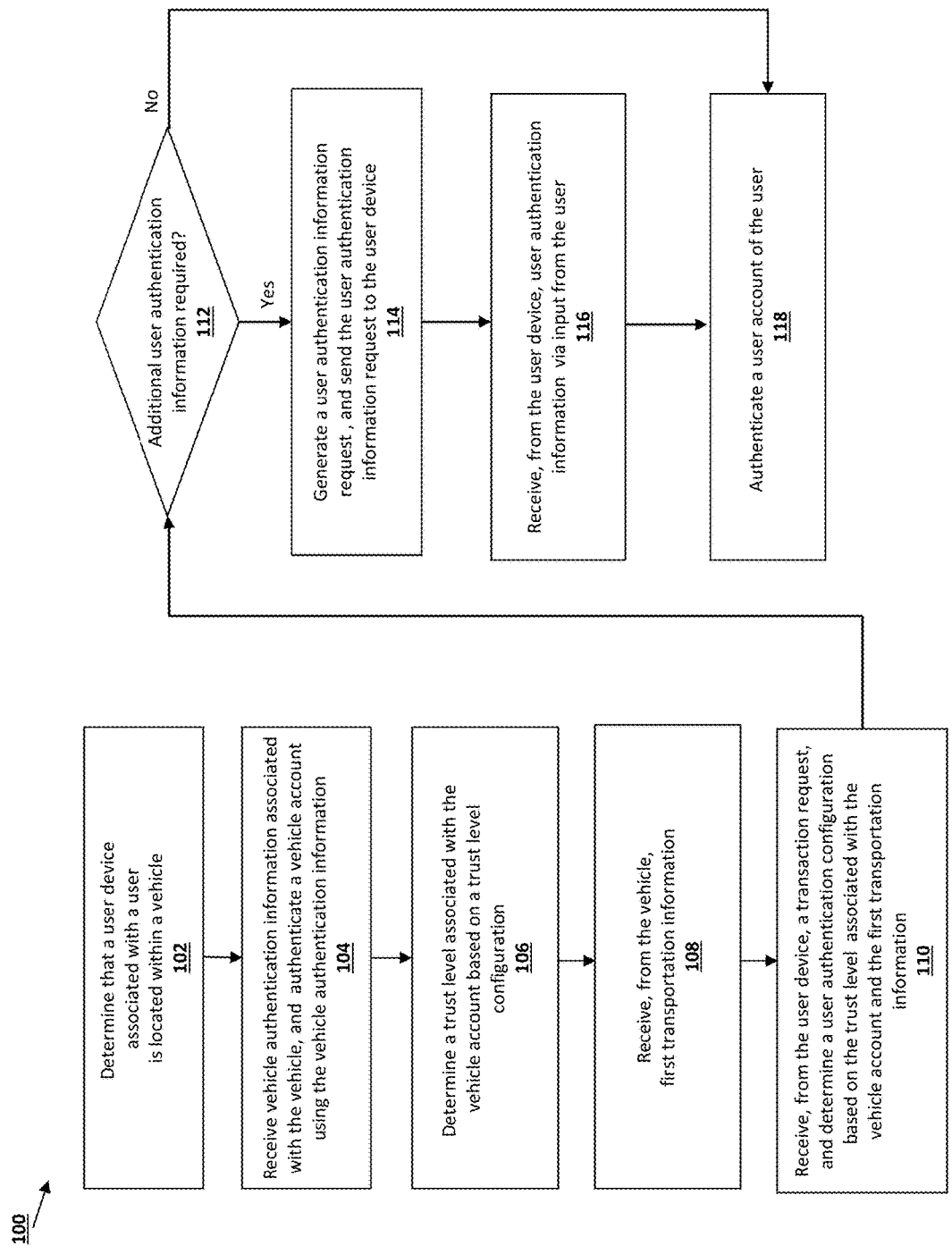
FIG. 1 is a flow chart illustrating an embodiment of a method for electronic authentication and device management.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Consumers routinely purchase products and services from merchants and individuals alike. The transactions may take place directly between a physical or on-line merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why on-line and mobile purchases are growing very quickly.

Utilizing advances in mobile transaction technology, consumers may now conduct electronic transactions when they are traveling in vehicles (e.g., cars, airplanes, ships, buses, trains, ferries, etc.) using their smartphones, tablets, laptop computers, and/or other personal mobile computing devices. However, mobile transaction systems sometimes have inconvenient features for customers that are traveling. For example, a mobile transaction system may request additional authentication information from the customer after detecting that the customer is at a new location. Further, mobile transaction systems often allow customers to conduct electronic transactions using mobile devices while driving, which may cause distracted driving and accidents and/or violate laws regulating the use of mobile devices while driving.

The present disclosure describes systems and methods for providing electronic authentication and device management to one or more user devices when a user associated with those user devices is traveling in a vehicle. The vehicle may be a personal car belonging to the user or belonging to another person, for example, a parent or a friend that offers their vehicle for use to an associated person. The vehicle may belong to a service that provides use of the vehicle to other users, such as a company car, a rental car, a fleet vehicle, and/or a car share service. The vehicle may be a vehicle for hire with a driver, such as a taxi often for a non-shared ride and an airport shuttle often for a shared ride. The vehicle may also be a vehicle other than a car, such as a boat, a motorcycle, an airplane, a bus, a motorhome, a helicopter, a water craft, a drone, etc. As discussed above, mobile transaction systems sometimes have inconvenient features for customers performing transactions when traveling in a vehicle using their user devices. However, in embodiments of the systems and methods described herein, a system provider device may determine a trust level for a vehicle account associated with the vehicle. In response to that determination, the system provider device may determine different authentication requirements for a transaction request from the user while traveling in the vehicle. For example, the system provider device may determine that a vehicle account having the user as a registered user is associated with a relatively higher trust level, and a transaction request from the user traveling in the corresponding vehicle may be automatically authenticated without additional authentications from the user. In another example, the system provider device may determine that a vehicle account with a vehicle for hire with a driver (e.g., a taxi, a shuttle) is associated with a relatively lower trust level, and additional authentications are required to authenticate a transaction request from the user in the corresponding vehicle. Other transportation information including for example, route information and speed information, may also be used to determine the authentication requirements for the transaction request. Moreover, the system provider device may determine various user device restrictions based on the transportation information (e.g., traffic and weather information) and/or the in-vehicle location of the user, and manage the user device by applying these user device restrictions. By restricting the use of the user device in a vehicle in response to the transportation information, the risk of distracted driving and accidents may be reduced.

Figure 2:
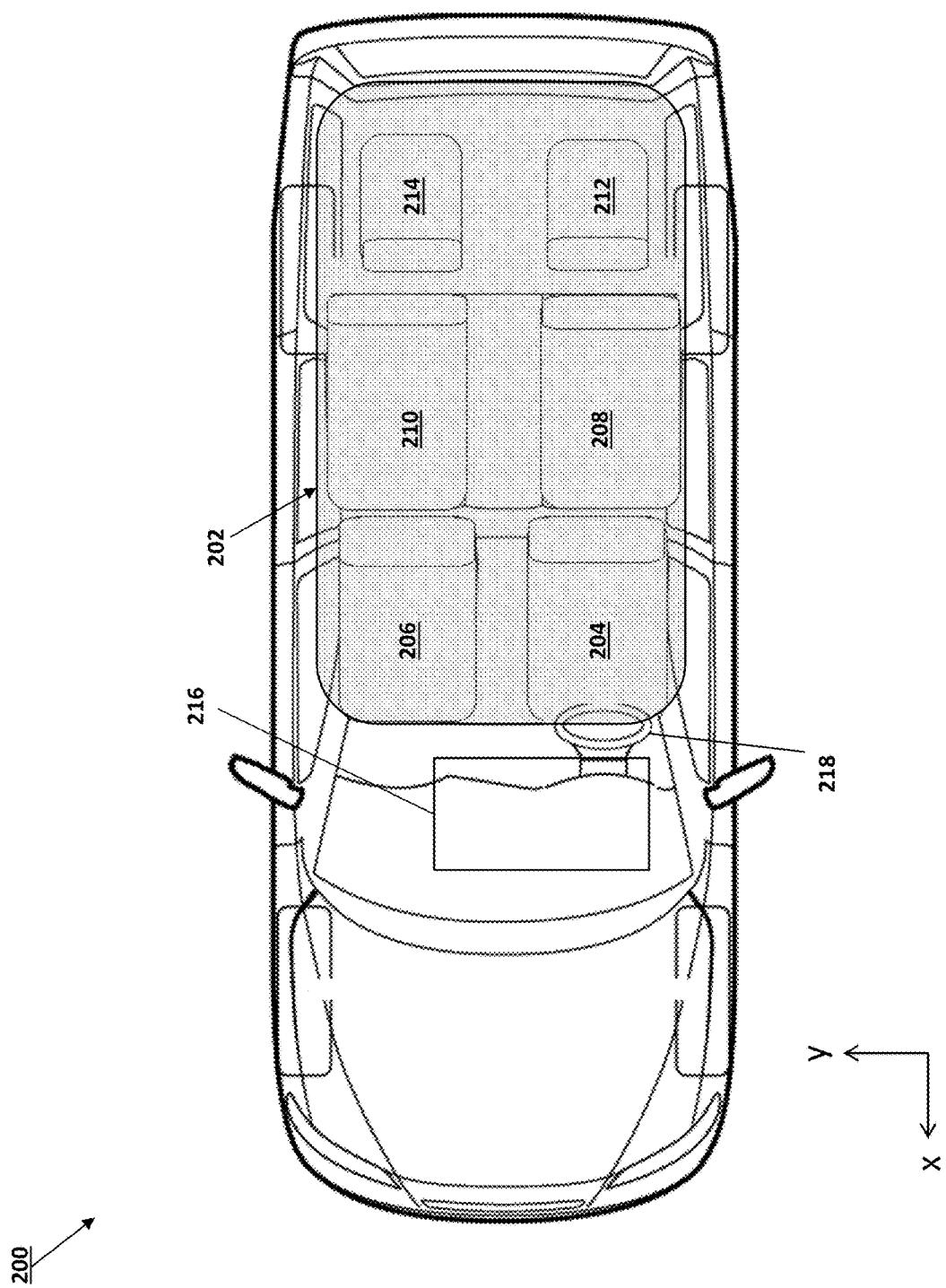
FIG. 2 is a diagram illustrating a top view of an embodiment of a vehicle.
Figure 3:
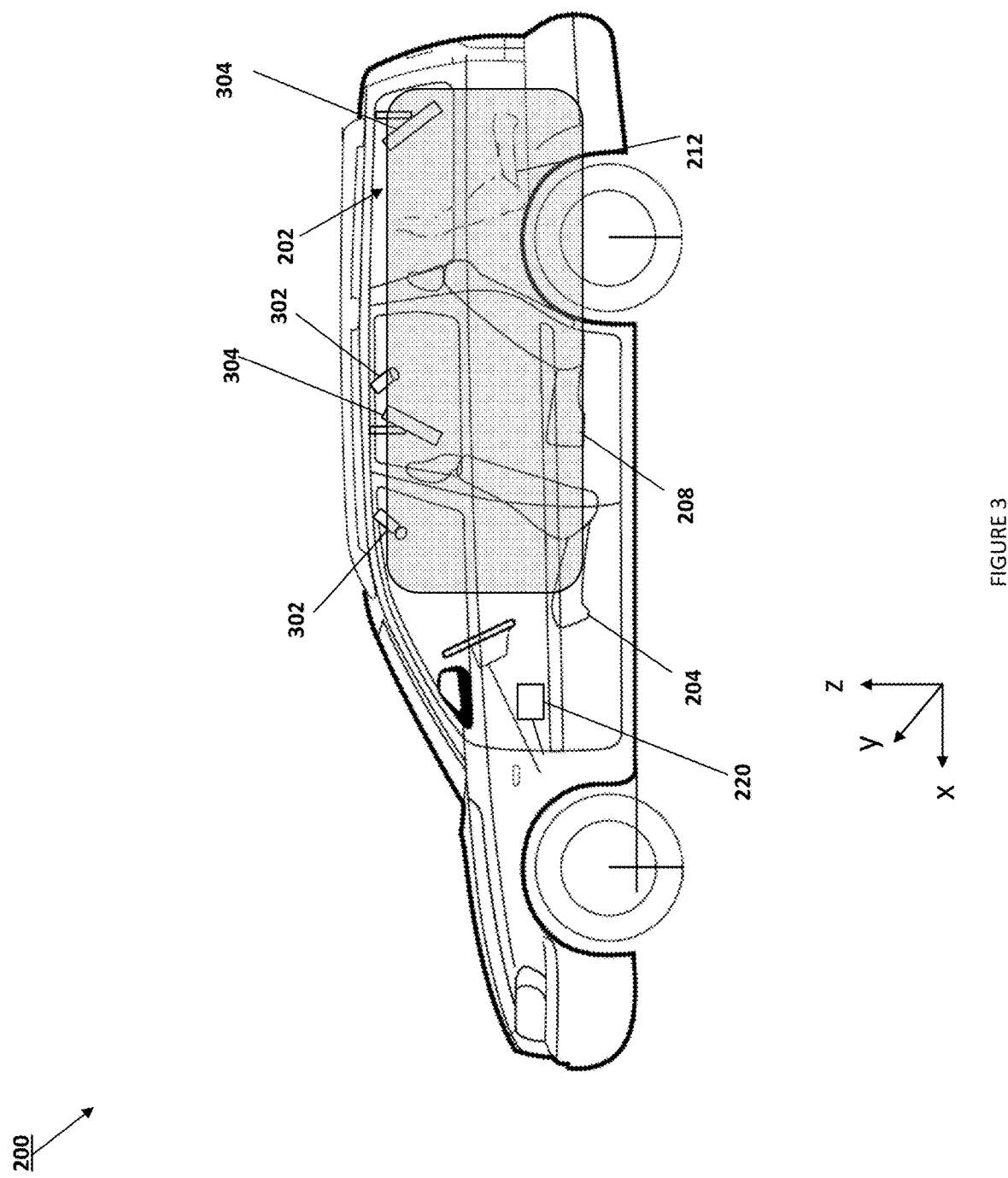
FIG. 3 is a diagram illustrating a side view of the vehicle of FIG. 2.
Figure 4:
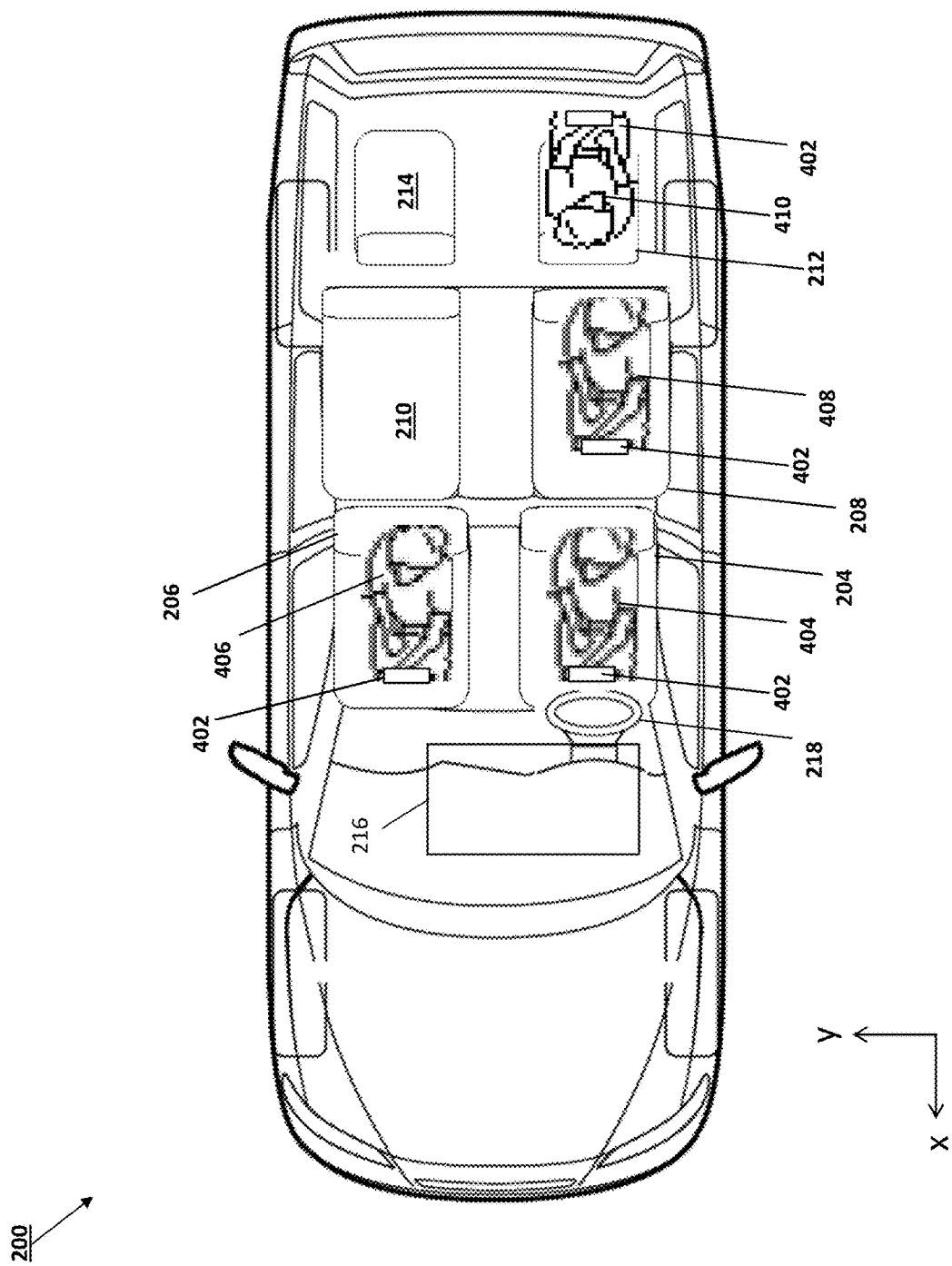
FIG. 4 is a diagram illustrating a top view of an embodiment of a vehicle.

Referring to FIG. 1, an embodiment of a method 100 for providing vehicle-based electronic authentication is illustrated. The method 100 may begin at block 102 where a system provider device determines that a user device associated with a user is located in a vehicle. Referring to FIGS. 2, 3, and 4, various embodiments of a vehicle 200 are illustrated. Referring to FIG. 2, the vehicle 200 is a car including a seating area 202 having a plurality of seats, including a driver's seat 204 and passenger's seats 206, 208, 210, 212, and 214. The seats may have different orientations and face different directions. For example, seats 204, 206, 208, and 210 are forward-facing seats, such that users sitting in those seats face the front of the vehicle 200. For further example, seats 212 and 214 are back-facing seats, such that users sitting in those seats are facing the back of the vehicle 200. The vehicle 200 may also include seats facing sides of vehicle 200 or any other directions.

The vehicle 200 may include a dashboard 216 located in front of the driver's seat 204. The dashboard 216 may include a steering wheel 218 and instrumentation to show transportation information associated with the vehicle 200, including for example, speed information provided by a speedometer, rotation speed information provided by a tachometer, individual trip distances and a total traveled distance provided by an odometer, and a fuel level provided by a fuel gauge. In addition, the vehicle 200 may include various measurement devices used to measure and collect other transportation information regarding for example, the vehicle's operation, state, and configuration, and the state of the user(s). In some examples, those transportation information may not be displayed in the dashboard 216. For example, the vehicle 200 may include an altitude meter providing an altitude of the vehicle. In another example, the vehicle 200 includes sensors in the seats providing information regarding presence and amount of weight and weight shift. In yet another example, the vehicle 200 includes motion sensors providing movement information of the user (e.g., passengers and/or the driver). In yet another example, the vehicle 200 may include one or more environmental sensors (e.g., a thermostat, a hygrometer) to measure the temperature, humidity, air, oxygen, carbon monoxide, and other environmental information in the seating area 202. In an example, those environmental sensors may be configured to measure the environment of the entire seating area 202. In another example, those environmental sensors may be configured to measure the environment of a zone corresponding to a particular user.

Illustrated in FIG. 3 is an example of a side view of the vehicle 200. As illustrated in FIG. 3, the vehicle 200 includes one or more cameras 302 positioned to capture images or videos of the dashboard 216, the users including the driver and passengers, and/or external conditions (e.g., road conditions, traffic conditions, weather conditions) outside of the vehicle 200. Such images and videos may also be utilized to identify transportation information from the dashboard 216 using an image recognition subsystem. Further, such images and videos may be utilized to identify road conditions, traffic conditions, or weather conditions using the image recognition subsystem of the vehicle 200.

The vehicle 200 may further include display subsystems 304 (e.g., mounted on the ceiling and/or sidewalls of the vehicle 200, installed on the back of the seats). In an example, a display subsystem 304 is configured such that multiple users (e.g., both users in seats 208 and 210 at the same row) may view the contents displayed on the display subsystem 304. In another example, the display subsystem 304 may include an adjustable private screen, which may be configured so that only a single user may view the contents displayed on the display subsystem 304.

In the illustrated example FIG. 3, the vehicle 200 include one or more communication devices or other wireless communication devices 220 that are configured to communicate with user devices, a system provider device, other vehicles, and/or any other devices and/or subsystems discussed below. In an example, the communication device 220 is a telematics device that may be installed in an onboard diagnostic lot of the vehicle 200. In another example, the communication device 220 is integrated with an onboard navigation system of the vehicle 200.

Referring to FIG. 4, illustrated is a vehicle 200 where users 404, 406, 408, and 410 are sitting in seats 204, 206, 208, and 212 of the vehicle 200 respectively, and each of the users 404, 406, 408, and 410 holds a user device 402. As shown in FIG. 4, user 404 is sitting in the driver's seat 204, and users 406, 408, and 410 are sitting in the passengers' seats. The users may face different directions based on the orientation of their seats. For example, users 404, 406, and 408 face the front of the vehicle 200, while user 410 faces the back of the vehicle 200.

In some embodiments, the communication device 220 of the vehicle 200 may include a radio frequency identification (RFID) tag, a near-field communication (NFC) tag, and/or other relatively short range wireless communications subsystems known in the art. As such, the vehicle and a user device 402 located in the vehicle may perform short-range (e.g., RFID or NFC) communications using an RFID/NFC subsystem (e.g., a tag and/or reader) in the user device 402 and an RFID/NFC subsystem (e.g., a tag and/or reader) in the communication device 220 of the vehicle 200. In some embodiments, the vehicle 200 may use the communication device 220 to communicate with a user device 402 using a short-range wireless communication protocol includes one of a Bluetooth communication protocol, a Bluetooth Low Energy (BLE) communication protocol, a near-field communication (NFC) communication protocol, a radio frequency identification (RFID) communication protocol, a Wi-Fi communication protocol, and/or other short range communication protocol. In some embodiments, the vehicle 200 may use the communication device 220 to communicate with the user device 402 and/or a system provider device through a network (e.g., wireless networks including telecommunications, mobile, and cellular phone networks).

Referring back to FIG. 1, at block 102, a system provider device determines that a user device associated with a user is located within a vehicle. In an example, the system provider device receives user device location data indicating the location of a user device 402 (e.g., provided by a Global Positioning System (GPS) in the user device 402) and vehicle location data indicating the location of the vehicle 200 (e.g., provided by a GPS in the vehicle 200). The system provider device may also receive seating area information indicating the area covered by the seating area 202 of the vehicle 200. The system provider device may then determine whether the user device 402 is located in the vehicle based on the user device location data, the vehicle location data, and/or the seating area information. In another example, the vehicle 200 detects the user device 402 by communicating with the user device 402 through a short-range wireless communication protocol, and sends a notification to the system provider device regarding the presence of the user device 402 in the vehicle 200. In that example, the system provider device may determine that a user device is located in the vehicle based on the notification from the vehicle 200.

The method 100 may then proceed to block 104, where the system provider device may receive vehicle authentication information associated with the vehicle, and authenticate a vehicle account associated with the vehicle using the vehicle authentication information. The vehicle authentication information may include vehicle identification information (e.g., a car registration number, a vehicle identification number (VIN), a security token, and/or any other vehicle identification information) associated with the vehicle. In some embodiments, the system provider device may receive the vehicle authentication information associated with the vehicle 200 from the user device 402. For example, the vehicle 200 may send the vehicle identification information to the user device 402 using a short-range wireless communication protocol. The user device 402 may then send the vehicle identification information through a network (e.g., wireless networks including telecommunications, mobile, and cellular phone networks) to the system provider device. In another example, the vehicle 200 may use the communication device 220 to send the vehicle identification information to the system provider device through a network (e.g., such as wireless networks including telecommunications, mobile, and cellular phone networks) without using a user device 402.

The vehicle account of block 104, in various embodiments, may be a unique account tied to a particular vehicle. This vehicle account can have a variety of associated information (see below), including vehicle identification information, vehicle type information, users associated with the vehicle, etc.

The method 100 may then proceed to block 106, where the system provider device may determine a trust level associated with the vehicle account based on a trust level configuration. At block 106, the system provider device may retrieve vehicle account information associated with the vehicle account of the vehicle (e.g., from a vehicle account database coupled to the system provider device). The vehicle account information may include vehicle type information identifying the type of the vehicle (e.g., a personal car, a rental car, a taxi, a shuttle, a bus, etc.). The vehicle account information may further include registered users information identifying users registered with the vehicle account. Registered users associated with the vehicle account may include an owner of the vehicle, an authorized driver of the vehicle, an authorized passenger of the vehicle, a family member/friend of the owner of the vehicle, and/or any other users registered with that vehicle account. An authorized vehicle controller (e.g., such as an owner of the vehicle, a fleet manager assigned to a fleet of the vehicle, a rental car operator for a vehicle, and/or any other authorized controller of the vehicle) may register and/or deregister uses associated with the vehicle account. For example, for a personal car account, the owner of the vehicle may add family members and friends to the registered users. For further example, for a rental car account, the rental car operator may add a user to the registered users of the vehicle account as an authorized driver when the user picks up the rental car from the rental car operator, and deregister the user (e.g., by removing the user from the registered users of the vehicle account) from the authorized driver of the vehicle account after the user returns the rental car to the rental car operator.

Figure 5:
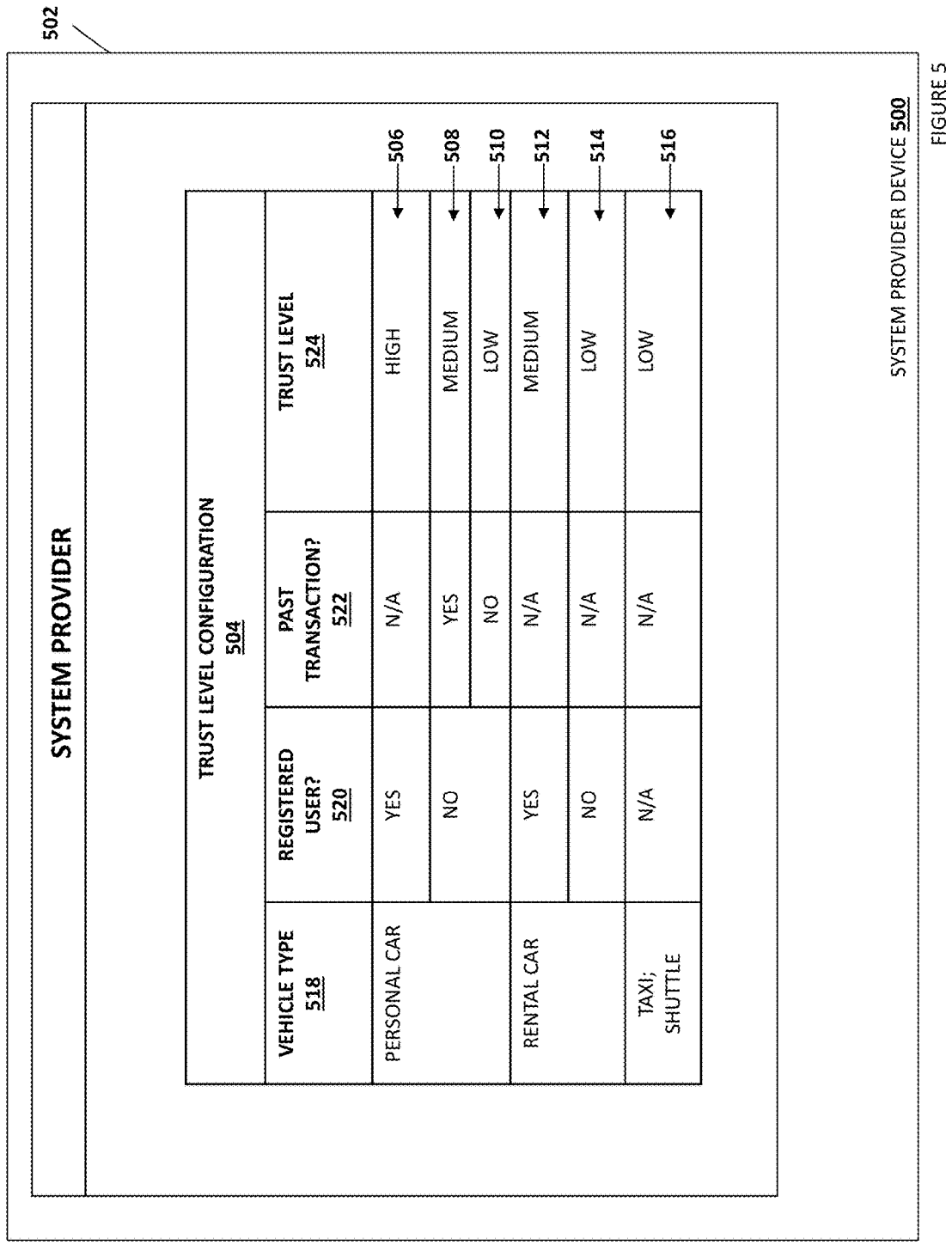
FIG. 5 is a diagram illustrating an embodiment of a system provider device displaying a trust level configurations screen.

At block 106, after retrieving the vehicle account information associated with the vehicle account, the system provider device may determine a trust level associated with the vehicle account based on the vehicle account information according to a trust level configuration. Referring now to FIG. 5, various examples of trust level configurations are illustrated. Illustrated in FIG. 5 is an embodiment of system provider device 500. The system provider device 500 includes a display subsystem 502 displaying a trust level configurations screen 504 that includes trust level configurations 506, 508, 510, 512, 514, and 516 that may have been previously received by the system provider device 500 from a user (e.g., via their user device or other devices). Each of the trust level configurations 506 through 516 may include vehicle type information 518, registered user information 520, past transaction information 522, and trust level information 524. The trust level configurations may also include any other characteristics of a vehicle or vehicle account for determining the trust level that would be apparent to one of skill in the art in possession of the present disclosure. For a particular vehicle account associated with a vehicle, the vehicle type information 518 may identify the type of that vehicle, including for example, a personal car, a rental car, a taxi, a bus, a sedan, a van, a sport utility vehicle (SUV), a convertible. The registered user information 520 indicates whether the user is a registered user of that particular vehicle account. The past transaction information 522 may indicate that a transaction has been performed by the user (e.g., using the user device or another user device associated with the user) while traveling in that vehicle. The past transaction information 522 may be determined based on the transaction history (e.g., retrieved from a transaction history database coupled to the system provider device) associated with the user and/or the vehicle account. The trust level information 524 indicates a trust level (e.g., "High", "Medium," "Low") associated with that particular vehicle account. In different embodiments, the user may add, remove, and/or edit the trust level configurations and/or any information associated with the trust level configurations. For example, any or all of the vehicle type information 518, registered user information 520, past transaction information 522, and trust level information 524 associated with the trust level configurations may be created, edited, and/or deleted by the user.

In the illustrated example, the trust level configurations 506, 508, and 510 provide that for a vehicle account associated with a personal car, the trust level may depend on whether the user is a registered user of the corresponding vehicle account, and/or whether a transaction has been performed by the user while traveling in that vehicle. For example, the trust level configuration 506 provides that a vehicle account associated with a personal car is associated with a "High" trust level if the user is a registered user of that vehicle account. On the other hand, the trust level configurations 508 and 510 provide if the user is not a registered user of that vehicle account, the vehicle account is associated with a "Medium" trust level if the user has performed a transaction while traveling in that personal car, and is associated with a "Low" trust level if the user has not performed any transaction while traveling in that personal car. In some embodiments, the transaction must have been performed within a certain time period from a current transaction request, such as with the last year or last six months. For a "High" trust level determination, in some embodiments, the system also looks at how recently the user registered with the vehicle account, e.g., a more recent registration, such as within the last month, may require additional authentication before deemed a "High" trust level.

In the illustrated example, the trust level configurations 512 and 514 provide that for a vehicle account associated with a rental car, the trust level may depend on whether the user is a registered user of that vehicle account. In the illustrated examples, the trust level for that vehicle account may not depend on the transaction history associated with the user and/or the rental car. For example, the trust level configuration 510 provides that the transaction request has a "Medium" trust level if the user is a registered user of the vehicle account associated with that rental car. In some embodiments, the trust level is further based on a location of the user using the rental car. For example, if the user has used a rental car at the location or is expected to use the rental car at that location (e.g., based on calendar information, travel plan information, such as airline ticket purchases), a higher trust level may be assigned. For further example, the trust level configuration 512 provides that the transaction request has a "Low" trust level if the user is not a registered user of the vehicle account associated with that rental car.

In the illustrated example, the trust level configuration 516 provides that for a vehicle account associated with a vehicle for hire with a driver (e.g., a taxi or a shuttle), the trust level is "Low." In the illustrated example, the trust level for that vehicle account does not depend on whether the user is a registered user of that vehicle account or whether the user has performed a transaction while traveling in that taxi or shuttle.

After the system provider device determines a trust level associated with the vehicle account based on a trust level configuration, the method 100 may then proceed to block 108, where the system provider device receives first transportation information associated with the trip that the user is taking with the vehicle. The first transportation information may relate to the vehicle, the user, and/or the trip. For example, the first transportation information may include vehicle speed information, vehicle location information, vehicle engine temperature information, vehicle RPM information, vehicle odometer information, vehicle oil pressure information, vehicle tire pressure information, vehicle environment information, route information indicating the route that the vehicle is traveling on, estimated arrival time information indicating an estimated time to arrive at a destination of the trip, traffic information, weather information, and/or any other transportation information.

In some embodiments, the system provider device may receive the first transportation information from the user device 402. For example, the vehicle 200 may send the first transportation information to the user device 402 using a short-range wireless communication protocol. The user device 402 may then send the first transportation information through a network (e.g., such as wireless networks including telecommunications, mobile, and cellular phone networks) to the system provider device. In another example, the vehicle 200 may use the communication device 220 to send the first transportation information to the system provider device through a network (e.g., such as wireless networks including telecommunications, mobile, and cellular phone networks) without using a user device 402.

The method 100 may then proceed to block 110, where the system provider device receives, from the user device, a transaction request, and determines a user authentication configuration associated with that transaction request based on the trust level associated with the vehicle account and the first transportation information. In various embodiments, the transaction request may be a payment transaction request for making a payment transaction using a payment account provided by a payment service provider, a purchase transaction request for making a purchase using a user account provided by a merchant, a gaming transaction request for playing games using a gaming account provided by a gaming service provider, and any other transaction request for performing a transaction using a user account provided by a third party service provider. In some embodiments herein, a "user account" may refer to a payment provider account such as a PayPal™ account that can be used to electronically transfer funds to other user accounts.

Figure 6:
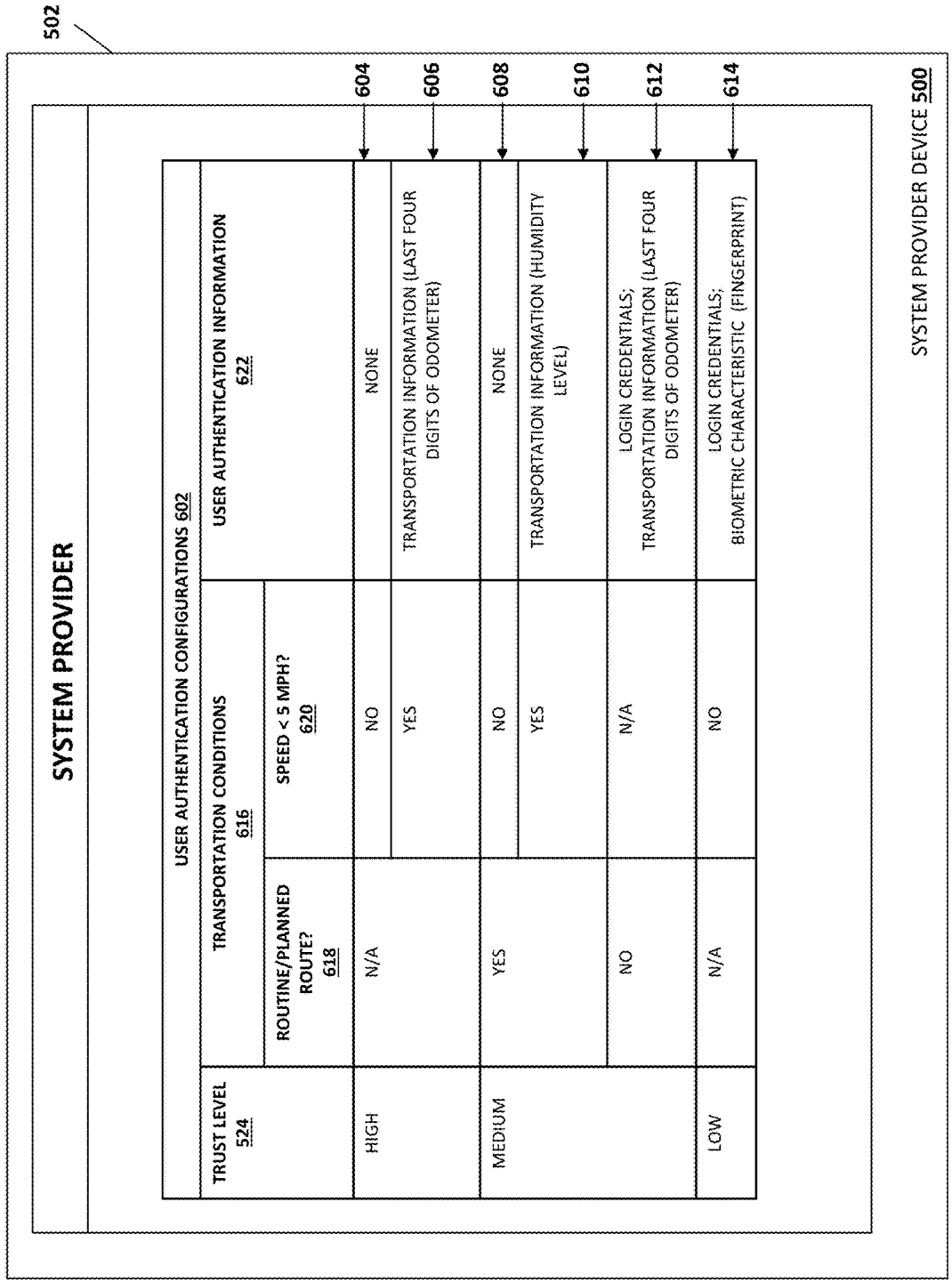
FIG. 6 is a diagram illustrating an embodiment of a system provider device displaying a user authentication configurations screen.

Illustrated in FIG. 6 are various user authentication configurations that the system provider device may use to determine user authentication requirements for a transaction request received from the user device located in a vehicle. Referring to FIG. 6, an embodiment of a system provider device 500 is illustrated. The system provider device 500 includes a display subsystem 502 displaying a user authentication configurations screen 602 that includes user authentication configurations 604, 606, 608, 610, 612, and 614 that may have been previously received by the system provider device 500 from a user (e.g., via their user device or other devices). Each of the user authentication configurations 604 through 614 may include trust level information 524 indicating a trust level associated with the vehicle account, transportation conditions 616, and/or user authentication information 622 indicating authentication requirements for user authentication.

In various embodiments, the system provider device 500 may determine a user authentication configuration associated with the transaction request based on the trust level of the vehicle account and transportation conditions determined using the first transportation information. For example, user authentication configurations 604 and 606 correspond to vehicle accounts associated with a high trust level. Because of the high trust level, user authentication configurations 604 allows automatic user authentication for the user device when the vehicle speed is above 5 MPH. However, authentication configurations 606 provides that when the vehicle speed is below 5 MPH, additional user authentication information is required as there is a greater chance that a person other than the user would be able to perform an attack on a parked or slow moving car. In another example, user authentication configurations 608, 610, and 612 correspond to vehicle accounts associated with a medium trust level, which provide that different user authentication requirements may be determined based on whether the vehicle is traveling on a routine/planned route. For example, user authentication configuration 612 provides if the vehicle is not traveling on a routine/planned route, then additional user authentication information is required. In yet another example, user authentication configuration 614 corresponds to vehicle accounts associated with a low trust level. Because of the low trust level, transportation information is not used for user authentication.

Referring back to FIG. 1, at block 110, the system provider device may determine various transportation conditions 616 (e.g., route type 618 and vehicle movement state 620) based on the first transportation information that the system provider device received at block 108. In some embodiments, the transportation conditions 616 may be used to evaluate the risk of a fraudulent transaction and determine the user authentication requirements according to the evaluated risk of the fraudulent transaction. For example, the system provider device may determine that the risk of a fraudulent transaction may be lower if the transaction request is received from a user device associated with a user traveling on a routine/planned route compared to a transaction request received from a user device associated with a user traveling on a new route. In another example, the system provider device may determine that the risk of a fraudulent transaction may be lower if the transaction request is received from a user device in a vehicle that is moving compared to a transaction request received from a user device in a vehicle that is not moving or is moving slowly.

In some embodiments, the system provider device may identify the user's routine routes and planned routes, and determine the route type 618 indicating whether the vehicle is traveling on a routine route or a planned route of the user based on the route information included in the first transportation information. The route type 618 may be determined based certain locations and times associated with the routine/planned routes.

In various embodiments, the system provider device may analyze movement and location history and purchase history of the user to determine routine routes taken by the user. In various examples, the routine routes may be determined based on the movement and location history (e.g., provided by a movement and location history database coupled to the system provider device) and transaction history (e.g., provided by a transaction history database coupled to the system provider device) associated with the user. Such movement and location history and transaction history may be collected based on movement and location data provided by the user device or any other user devices associated with the user, based on movement and location data provided by vehicles in which the user has traveled, and/or based on transaction data provided by merchants where the user has performed transactions. The routine routes may be determined based on certain times, days, months, seasons, and/or year. For example, the user may have different travel routines for weekdays and weekends. In another example, the user may have different routines for different days of the week, different seasons of the year, and the like. For example, the system provider device may determine that user has a routine route on weekends starting from home, a local café for brunch, gym, shopping mall, and then home after determining that such a route is repeated many times by the user on weekends. The system provider device may monitor and update the user's location and movement and may update the user's routine routes as the user's routine routes may change over time.

In some embodiments, the system provider device may retrieve information from, with the user's permission, the user's schedule, calendar, to-do list, emails, and the like and may analyze that information to determine the user's routine routes and planned routes. For example, the system provider device may retrieve a calendar event from the user's calendar indicating that the user has a doctor's appointment at a doctor's office at a particular time, analyze movement and location history of the user associated with visits to that doctor's office, and determine a planned route to that dentist's office around that particular time.

At block 110, the system provider device may determine the vehicle movement state 620 indicating that the vehicle is not moving or moving slowly (e.g., by comparing with a threshold speed of 5 miles per hour (MPH)) based on speed information included in the first transportation information. In some embodiments, additional user authentication information is required for a transaction request associated with a vehicle that is moving slowly or is not moving. For example, a person other than the user may be in possession of the user device. That person may attempt to perform a fraudulent transaction using a user account associated with the user by using the user device while standing next to that vehicle. In some examples, because the user device is within the short-range communication range of the communication device of the vehicle, there is a risk that at block 102, the vehicle may detect that user device and still notify the system provider device that that user device is within the vehicle. In another example, because of the inaccuracy of location data provided by the vehicle and the user device, there may be a risk that at block 102, the system provider device determined that the user device is located within the vehicle based on those location data. As such, to reduce the risk of such fraudulent transactions and increase security, additional user authentication information may be required for a transaction request associated with a vehicle that is not moving or is moving slowly. In some embodiments, the additional user authentication information may include transportation information that is available to a person inside the vehicle but is not available to a person standing next to the vehicle. For example, the required transportation information may include information available on the dashboard, e.g., an odometer mile reading of the vehicle. In another example, the required transportation information may include information not available on the dashboard, e.g., environment information measured by the environment sensors of the vehicle. On the other hand, in some examples, the risk associated with such fraudulent transactions may be lower for a transaction request associated with a vehicle that has a speed greater than a certain speed threshold, and no additional user authentication information is required.

In some embodiments, to determine the vehicle movement state 620, the system provider device may compare the speed of the vehicle with a threshold speed (e.g., 5 miles per hour (MPH)). Such a threshold speed may be determined on various factors that may be associated with a risk of fraudulent transaction including for example, the accuracy of the location data of the vehicle and/or the user device, and crime statistics (e.g., a mobile device theft rate, a robbery rate) of a neighborhood of the vehicle's location. In some embodiments, the threshold speed may be determined based the accuracy of the location data of the vehicle and/or the user device. In the illustrated example, the location data of the vehicle and/or the user device have a horizontal accuracy of about two meters at a 95% confidence level, and the corresponding threshold speed is about 5 MPH. In another example where the location data of the vehicle and/or the user device have a higher horizontal accuracy (e.g., a horizontal accuracy of about 0.5 meter at a 95% confidence level), the threshold speed may be decreased to about 2 MPH. In yet another example where the location data of the vehicle and/or the user device have a lower horizontal accuracy (e.g., a horizontal accuracy of about four meter at a 95% confidence level), the threshold speed may be increased to about 10 MPH.

In some embodiments, the threshold speed may be determined based on crime statistics (e.g., a mobile device theft rate, a robbery rate) of a neighborhood of the vehicle's location. For example, the system provider device may decrease the threshold speed after determining that the vehicle is located in a neighborhood with a lower crime rate (e.g., a lower mobile device theft rate, a lower robbery rate), and increase the threshold speed after determining that the vehicle is located in a neighborhood with a higher crime rate (e.g., a higher mobile device theft rate, a higher robbery rate).

In various embodiments, the system provider device 500 may determine a user authentication configuration associated with the transaction request based on the trust level of the vehicle account and the transportation conditions determined using the first transportation information. The user authentication configuration may provide user authentication information 622 indicating the authentication requirements for user authentication for that transaction request. In the illustrated example, the user authentication configurations 604 and 606 provide that for a vehicle account associated with a "High" trust level, user authentication information 622 required for user authentication may be determined based on the vehicle movement state 620. The user authentication configuration 604 provides that if the vehicle movement state 620 indicates that the vehicle's speed is not less than a speed threshold (e.g., "5 MPH"), no additional user authentication information is required for user authentication. The user authentication configuration 606 provides that if the vehicle movement state 620 indicates that the vehicle's speed is less than a speed threshold (e.g., "5 MPH"), additional user authentication information (e.g., transportation information including the last four digits of the odometer mile reading of the vehicle) is required for user authentication. As shown in the illustrated example, user authentication information 622 of the user authentication configurations 604 and 606 may not depend on the route type 618.

In the illustrated example, user authentication configurations 608, 610, and 612 provide that for a vehicle account associated with a "Medium" trust level, user authentication information 622 may be determined based on route type 618 and vehicle movement state 620. For example, user authentication configuration 608 provides that if the route type 618 indicates that the vehicle is traveling on a routine/planned route, and that if the vehicle movement state 620 indicates that the vehicle is moving at a speed not less than a threshold speed (e.g., 5 MPH), then no additional user authentication information. For further example, user authentication configuration 610 provides that if the route type 618 indicates that the vehicle is traveling on a routine/planned route, and the vehicle movement state 620 indicates that the vehicle is moving at a speed less than a threshold speed, additional user authentication information (e.g., transportation information including a vehicle humidity level) is required for user authentication. For further example, user authentication configuration 612 provides that if the route type 618 indicates that the vehicle is not traveling on a routine/planned route of the user, additional user authentication information is required for user authentication. The additional user authentication information 622 of the user authentication configuration 612 includes login credentials (e.g., username and password) of the user account associated with the user and transportation information including the last four digits of the odometer mile reading of the vehicle.

In the illustrated example, user authentication configuration 614 provides user authentication information required for a vehicle account associated with a "Low" trust level. In that example, the user authentication configuration 614 provides that user authentication may be performed without using any transportation information associated with trip. Instead, login credentials (e.g., username and password) and biometric characteristics (e.g., fingerprint) are required for user authentication.

The method 100 then proceeds to decision block 112, where the system provider device determines whether additional user authentication information is required for user authentication based on the user authentication configuration determined at block 110. In some embodiments, the system provider device determines that no additional user authentication information is required. For example, at block 110, the system provider device may determine that user authentication configuration 604 or 608 is associated with the transaction request, and in response, determines that no additional user authentication information is required for user authentication. In those embodiments, the method 100 may then proceed to block 118, where the system provider device automatically authenticates the user account of the user for the transaction request received from the user device.

In some embodiments, the system provider device determines that additional user authentication information is required. For example, at block 110, the system provider device may determine that user authentication configuration 606, 610, 612, or 614 is associated with the transaction request, and in response, determine that additional user authentication information is required for authenticating a user account associated with the user. In those embodiments, the method 100 may then proceed to block 114, where the system provider device generates a user authentication information request based on the user authentication configuration determined at block 110, and sends the generated user authentication information request to the user device.

Figure 7:
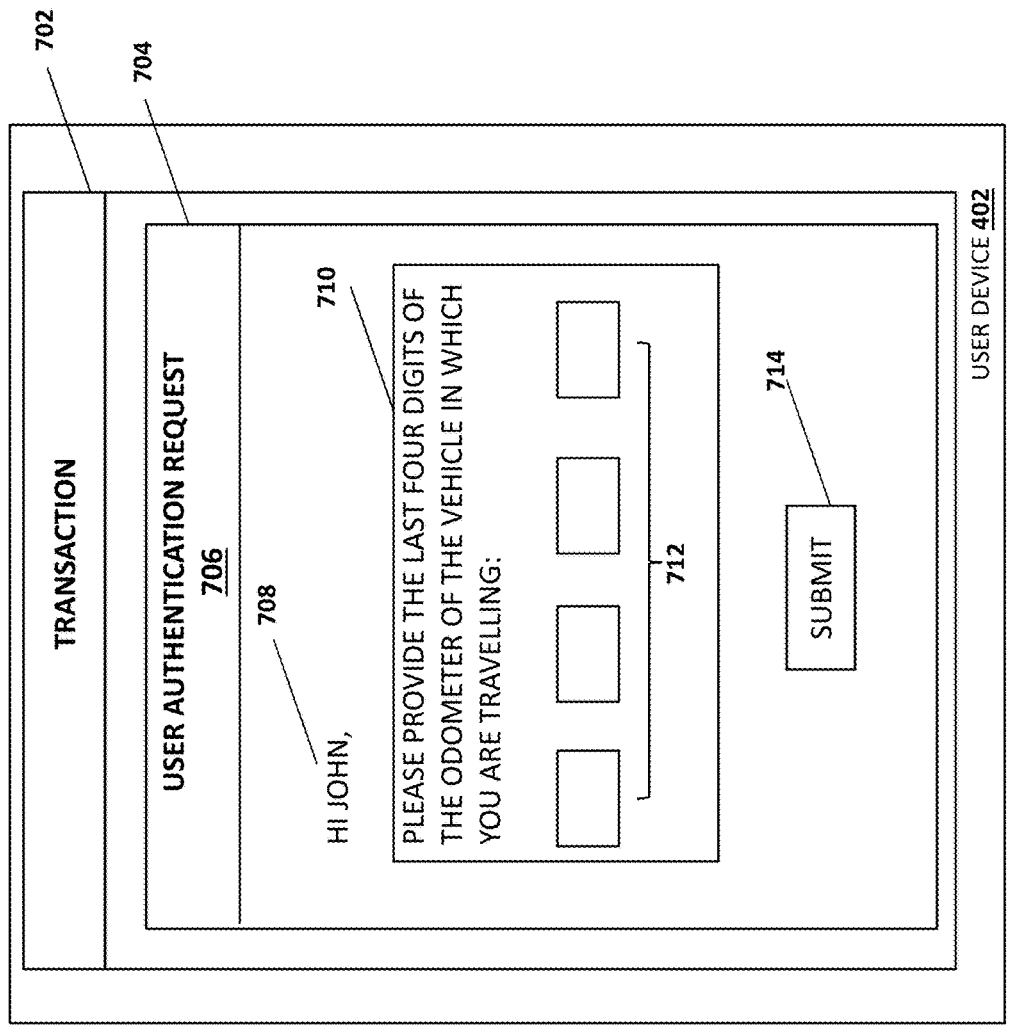
FIG. 7 is a diagram illustrating an embodiment of a user device displaying a user authentication request screen.

Referring to FIG. 7, an embodiment of a user device 402 is illustrated. The user device 402 includes a display subsystem 702 displaying a user authentication request screen 704 that includes a user authentication request 706 received from the server provider device. In the illustrated example, the system provider device determines user authentication configuration 610 is associated with the transaction request, and generates the user authentication request 706 based on user authentication configuration 610. The user authentication request 706 further includes an authentication information area 710 for the user to provide the requested authentication information according to the user authentication information 622 of the user authentication configuration 610. In the illustrated example, the authentication information area 710 provides a message (e.g., "last four digits of the odometer of the vehicle") indicating the requested authentication information type, and input fields 712 for the user to input the requested transportation information. Following the provision of the requested transportation information, the user may then select a submit button 714 to provide the requested transportation information to the system provider device via the user device 402.

The method 100 may then proceed to block 116, where the system provider device receives, from the user device, user authentication information via input from the user. In some embodiments, at block 116, the user in the vehicle is at a location (e.g., sitting in seats 204 or 206) that has a view of the dashboard 216, read the required authentication information (e.g., the last four digits of the odometer) from the dashboard 216, and inputs those digits in the input fields 712 of FIG. 7. In some embodiments, the user is sitting in a location (e.g., sitting in seats 208, 210, 212, or 214) and does not have a view of the dashboard 216. In such embodiments, the system provider device determines that the user is not able to view the dashboard 216 (e.g., based on in-vehicle user location of the user), and sends a display request to the vehicle 200 so that the transportation information required for authentication is displayed on a display subsystem 502 near the user. In an example, the vehicle 200 uses a camera 302 to take an image of the dashboard 216, and send that image for display on the display subsystem 502. In some examples, the system provider device determines that a display subsystem 502 near the user is a window near the user, and requests the vehicle 200 to project (e.g., using a projector mounted on the ceiling of the vehicle 200) the image on that window.

In some embodiments, the requested authentication information (e.g., humidity level information as provided by user authentication configuration 612) is not included in the dashboard 216. In such embodiments, the vehicle 200 may send the requested authentication information to a display near the user without determining whether the user has a view of the dashboard 216.

While odometer mile reading information and humidity information are used as examples to describe transportation information used for user authentication, other transportation information may be used. In an example, user device orientation information from the user device (e.g., provided by an accelerometer, a gyroscope, and/or a compass of the user device) may be provided to the system provider device, and the system provider device may perform user authentication by determining whether the user device orientation information corresponds to a seat orientation of a seat where the user sits.

The method 100 may then proceed to block 118, where the system provider device receives, from the user device, the user authentication information. The system provider device then authenticates the user account of the user after determining that the user authentication has satisfied the user authentication requirements according to the user authentication configuration. Referring to FIG. 7, in the illustrated example, the system provider device receives the user authentication information (e.g., "last four digits of the odometer of the vehicle") from the authentication information area 710 of the transaction request, and validates the received user authentication information by comparing it with the corresponding transportation information (e.g., odometer miles reading information included in the first transportation information) that the system provider device received from the vehicle. In an example, that corresponding transportation information is the first transportation information that the system provider device received from the vehicle at block 108. In another example, the system provider device sends a request to the vehicle so that the system provider device receives updated corresponding transportation information for performing the authentication.

Note that in various embodiments, it is possible to authenticate a user account before a transaction request is initiated. For example, a user can pre-authenticate using methods and techniques described herein before clicking a "buy" button at a shopping website. Thus, vehicle related authentication can persist and allow a user account to stay authenticated for some period of time. For example, performing vehicle related authentication may allow a user account to be authenticated for a period of up to 30 minutes as long as the vehicle remains in motion greater than 5 mph. Once authenticated, in this embodiment, there may be no need to re-authenticate the user account for a transaction within this period.

As discussed above, conducting electronic transactions using mobile devices while driving may cause distracted driving and accidents and/or violate laws regulating the use of mobile devices while driving. To address those concerns, a method for providing vehicle-based device management is provided. The system provider device may determine various user device restrictions based on the transportation information (e.g., traffic and weather information) and/or the in-vehicle location of the user, and manage the user device by applying these user device restrictions. By restricting the use of the user device when traveling in a vehicle in response to the transportation information, the risk of distracted driving and accidents may be reduced.

Figure 8:
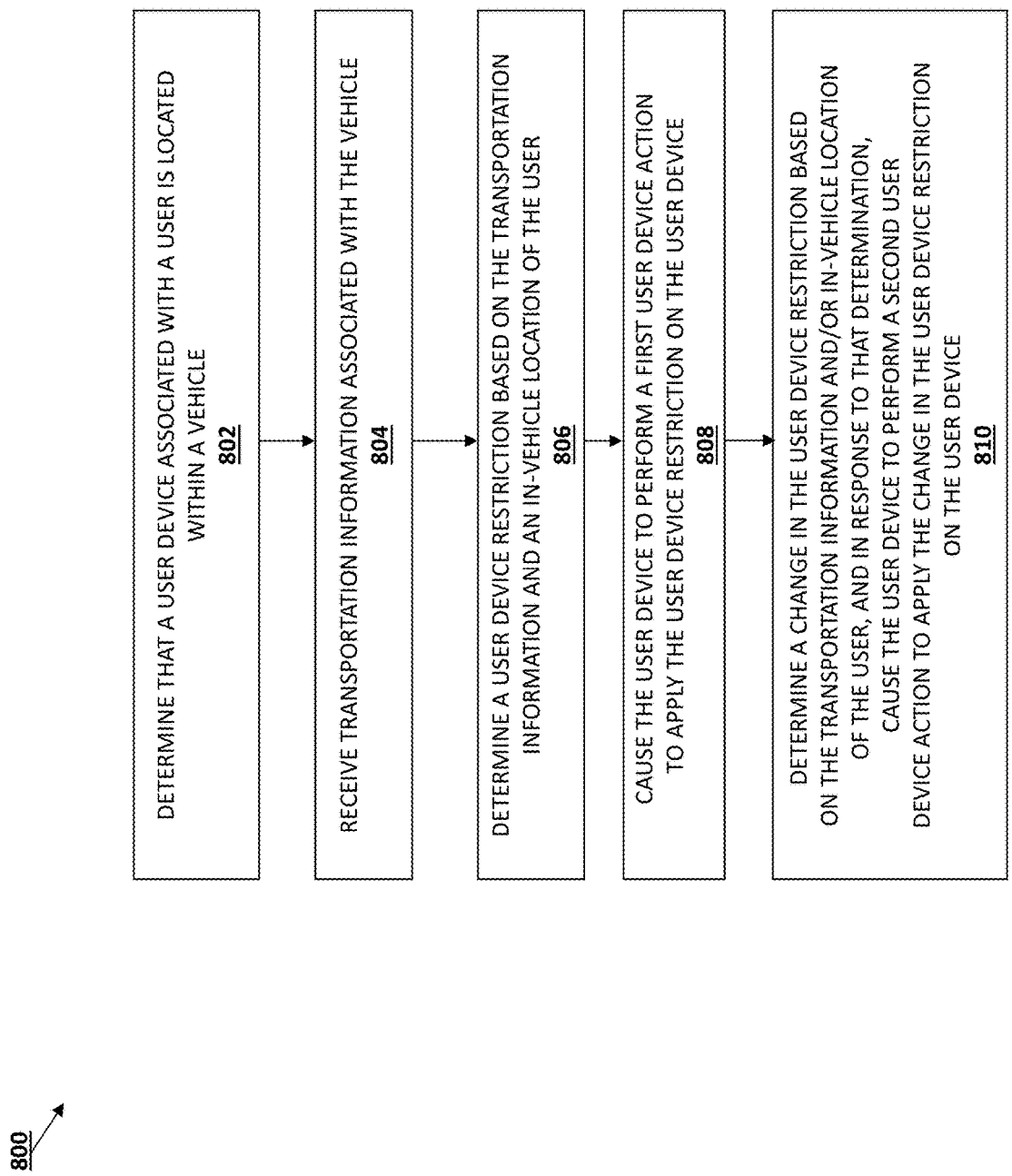
FIG. 8 is a flow chart illustrating an embodiment of a method for managing a user device based on transportation information.

Referring to FIG. 8, an embodiment of a method 800 for providing vehicle-based device management is illustrated. The method 800 may begin at block 802, where a system provider device determines that a user device associated with a user is located within a vehicle, substantially in the manner described above with respect to block 102 of method 100.

The method 800 may then proceed to block 804, where a system provider device receives transportation information associated with the vehicle. In some embodiments, the system provider device receives transportation information from the vehicle, substantially in the manner described above with respect to block 108. In some embodiments, the system provider device receives transportation information for third-party service providers. For example, the system provider device may receive transportation information including weather condition information from a weather service provider based on the location data of the vehicle. For further example, the system provider device may receive transportation information including real-time traffic information from a traffic information provider based on the location of the vehicle.

Figure 9:
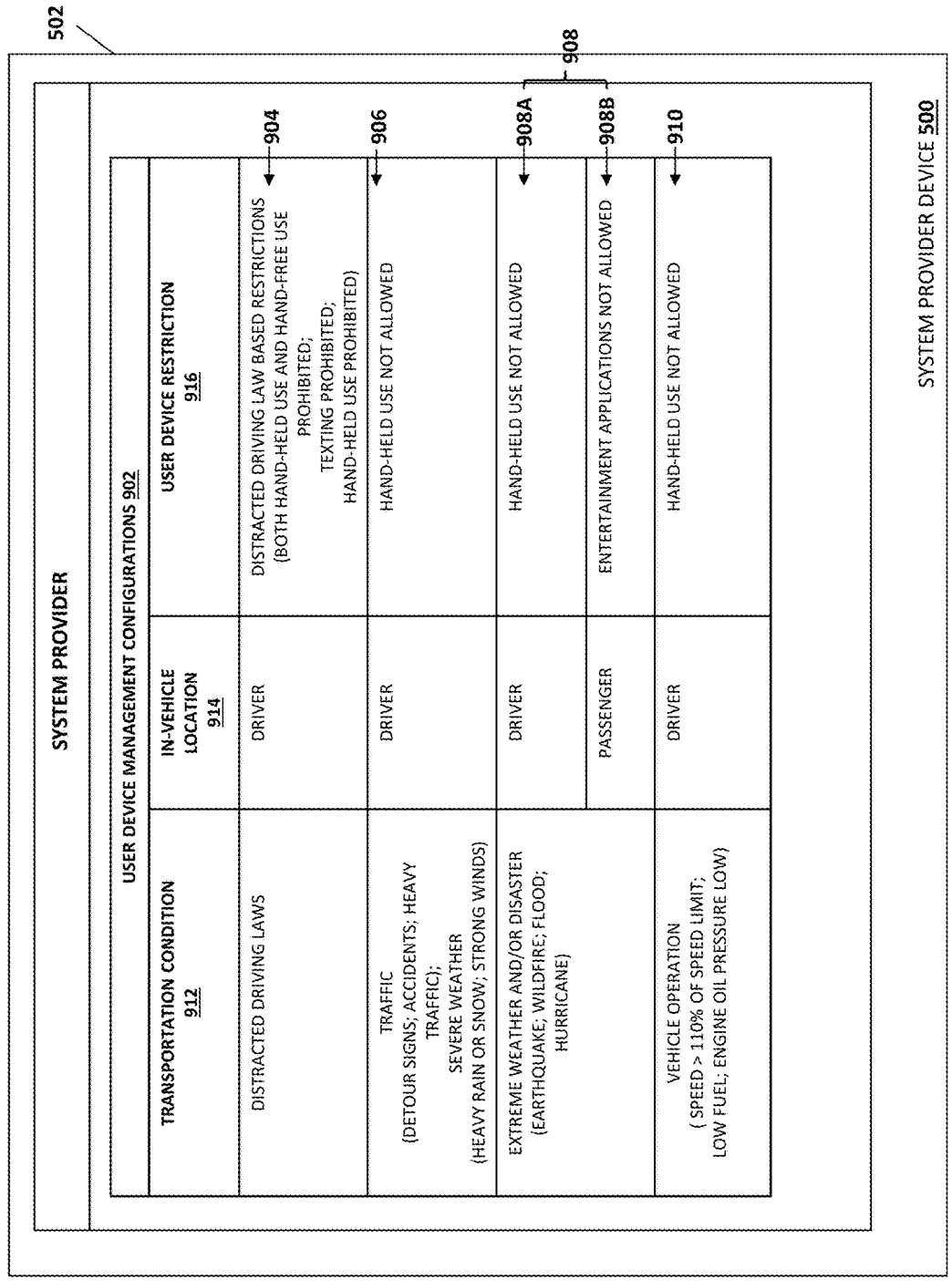
FIG. 9 is a diagram illustrating an embodiment of a system provider device displaying a user device management configuration screen.

The method 800 may then proceed to block 806, where a system provider device determines a user device restriction based on the transportation information and/or an in-vehicle location of the user according to user device management configurations. With reference to FIG. 9, examples of user device management configurations that may be used by various embodiments of the method 800 to determine whether a user device restriction is to be applied to the user device are shown. Illustrated in FIG. 9 is an example of a system provider device 500 including a display subsystem 502 displaying a user device management configurations screen 902 that includes user device management configurations 904, 906, 908, and 910 that may have been previously received by the system provider device 500 from a user (e.g., via their user device or other devices). Each of the user device management configurations 904, 906, 908, and 910 may include transportation condition information 912, in-vehicle location information 914, user device restriction information 916, and/or any other user device management information.

In some embodiments, the system provider device 500 may determine the user device restriction based on a transportation condition including distracted driving laws information associated with the trip. Distracted driving laws are laws regulating the act of driving while engaged in other activities including for example, texting, talking on the phone, watching video, eating, reading, using a mobile device, and any other activities that may distract the driver. In the illustrated example, the user device management configuration 904 includes transportation condition information 912 (e.g., "Distracted driving laws") providing that the vehicle is located in an area where distracted driving laws regulating mobile device use while driving applies. For example, the system provider device may determine that the vehicle is located in a state, a county, and/or a city that has distracted driving laws prohibiting hand-held mobile device use while driving (e.g., based on vehicle location data included in the transportation information received at block 804). In another example, the system provider device may determine that the vehicle is located in a specific zone (e.g., a school zone, a construction zone) that distracted driving laws apply. The user device management configuration 904 further includes in-vehicle location information 914 (e.g., "Driver") providing that the user has an in-vehicle location indicating that the user is a driver of the vehicle. For example, the system provider may determine that the user is a driver of the vehicle by determining that the user is sitting in a driver's seat behind the wheel of the vehicle. The user device management configuration 904 may then determine the user device restrictions associated with the applicable distracted driving laws to be applied to a user device associated with the driver. In various embodiments, distracted driving laws in different areas may provide different user device restrictions, including for example, a user device restriction prohibits both hand-held use and hand-free use of the mobile device while driving, a user device restriction prohibits only texting using the user device while driving, a use device restriction prohibits only hand-held use of the user device while driving, and/or any other types of user device restrictions.

In some embodiments, the system provider device 500 may determine the user device restriction based on a transportation condition including traffic condition information associated with the trip of the user traveling in the vehicle. In the illustrated example, the user device management configuration 906 includes transportation condition information 912 (e.g., "Traffic conditions," "Severe weather conditions") providing that there are traffic conditions (e.g., detour signs, accidents, heavy traffic, and/or any other traffic conditions) and/or severe weather conditions (e.g., heavy rain or snow, strong winds, and/or other severe weather conditions) that need the driver to focus attention on the road. The user device management configuration 906 further includes in-vehicle location information 914 (e.g., "Driver") providing that the user has an in-vehicle location indicating that the user is a driver of the vehicle. For example, the system provider may determine that the user is a driver of the vehicle by determining that the user is sitting in a driver's seat behind the wheel. The user device management configuration 906 further includes the user device restriction information 916 (e.g., "Hand-held use not allowed") providing that hand-held use of the mobile device while driving is not allowed when there are traffic conditions that need the driver's attention.

In some embodiments, the system provider device 500 may determine the user device restriction to be applied to a user device based on a transportation condition including extreme weather and/or disaster condition information associated with the trip. Such extreme weather and/or disaster information may include information for various extreme weather and/or disaster events including, for example, wildfires, flood, hurricanes, tornadoes, volcanic eruptions, earthquakes, tsunamis, and/or any other extreme weather and/or disaster events. As shown in the exemplary user device management configuration 908, such a transportation condition including extreme weather and disaster information may need both the driver and the passengers' attention, so that people in the vehicle may take proper steps (e.g., taking an evacuation route) in response to the extreme weather and disaster information. Accordingly, user device restrictions associated with that transportation condition may apply to a user device associated with a passenger as well as a user device associated with the driver of the vehicle. For example, the user device management configuration 908 includes user device management configurations 908A and 908B for user devices associated with a driver of the vehicle and a passenger of the vehicle respectively. In some examples, according to the user device management configuration 908A, for a user device associated with a driver of the vehicle under an extreme weather and/or disaster condition, a user device restriction 916 of the user device management configuration 908A provides that hand-held use of the user device is not allowed. On the other hand, in some examples, according to the user device management configuration 908B, for a user device associated with a passenger of the vehicle under an extreme weather and/or disaster condition, a user device restriction 916 of the user device management configuration 908B provides that it is not allowed to use entertainment applications (e.g., shopping applications, gaming applications, payment applications, etc.) of the user device. Note that in those examples, other applications (e.g., navigation applications, calling and texting applications) may still be allowed.

In some embodiments, the system provider device 500 may determine the user device restriction to be applied to a user device based on a transportation condition including vehicle operation conditions associated with the vehicle. In the illustrated example, the user device management configuration 910 includes transportation condition information 912 (e.g., "Vehicle operation") providing that there are vehicle operation conditions that need's the driver attention. Such vehicle operation conditions may include, for example, speeding information indicating that the vehicle is driving at a speed exceeding the speed limit by at least about 10%, low fuel information indicating that the vehicle is low on gas, and engine oil pressure low information indicating that there may be an issue with the engine of the vehicle. The user device management configuration 910 further includes in-vehicle location information 914 (e.g., "Driver") providing that the in-vehicle location of the user indicates that the user is a driver of the vehicle. The user device management configuration 906 further includes the user device restriction information 916 (e.g., "Hand-held use not allowed") providing that hand-held use of the mobile device while driving is not allowed when there are vehicle operation conditions that need the driver's attention.

After determining a user device restriction based on the transportation information and the in-vehicle location of the user according to the user device management configurations, the method 800 may proceed to block 808, where the system provider device causes the user device to perform a first user device action to apply the user device restriction on the user device. In an example, the user device restriction provides that hand-held use is not allowed (e.g., as provided by user device management configurations 906, 908A, and 910). In that example, the first user device action may disable some hand-held functionality (e.g., touch-screen functionality, typing functionality) of the user device by, for example, locking a screen of the user device. In that example, however, some voice-activated functionality (e.g., voice-activated functionality in a navigation application) of the user device may remain enabled, such that the user may continue to use particular applications (e.g., the navigation application). In another example, the user device restriction provides that particular applications are not allowed (e.g., entertainment applications are not allowed as provided by the user device management configuration 908B). In that example, the first user device action may disable those particular applications. In various embodiments, the first user device action may further include displaying a notification message on the user device notifying the user the transportation condition information.

In different embodiments, an authorized controller of the vehicle (e.g., an owner of the vehicle, a fleet manager assigned to a fleet of the vehicle, a rental car operator for the vehicle, and/or any other authorized controller of the vehicle) may add, remove, and/or edit the user device management configurations and/or any information associated with the user device management configurations. For example, any or all of the transportation condition information 912, in-vehicle location information 914, and user device restriction information 916 associated with the user device management configurations may be created, edited, and/or deleted by the customer.

The method 800 may then proceed to block 810, where the system provider device determines that there is a change in the user device restriction based on transportation information and/or in-vehicle location of the user. In response to such a determination, the system provider device causes the user device to perform a second user device action to employ the change in the user device restriction.

In some embodiments, the system provider device may determine that the user device restriction applied to the user device is no longer applicable based on the updated transportation information and/or in-vehicle location of the user received by the system provider device. In an example, a distracted driving law based restriction has already been applied to the user device, where that distracted driving law based restriction was determined accordingly to the user device management configuration 904. In that example, the system provider device may determine that the distracted driving laws no longer apply because the vehicle has moved to an area having no distracted driving laws and/or the in-vehicle location indicates that the user has moved from the driver's seat to a passenger's seat. In such embodiments, the system provider device may cause the user device to perform an action that removes the previously applied user device restriction (e.g., by enabling the disabled functionalities of the user device associated with the previously applied user device restriction).

In some embodiments, based on the updated transportation information and/or in-vehicle location of the user the system provider device may determine a new user device restriction that is different from the user device restriction that has already been applied to the user device. In such embodiments, the system provider device may determine the change between the new user device restriction and the user device restriction that has already been applied to the user device, and cause the user device to perform an action to apply the change in the user device restriction.

Thus, systems and methods have been described that provide customers/users, vehicle controllers, system providers, and various third-party service providers authentication and user device management systems and methods that perform authentication and user device management based on transportation information associated with a vehicle in which the user is traveling. In some embodiments, the vehicles may be associated with different security levels such as for example, requiring different authentications for authenticating a transaction request sent by a user device of the user in the vehicle. Accordingly, user experience may be improved without compromising security. For example, after a system provider device determines that the vehicle is associated with a trusted vehicle account, the transaction request may be automatically authenticated without requiring additional authentications from the user. In another example, after a system provider device determines that the vehicle is associated with a less trusted vehicle account, the user may be requested to provide authentication information including transportation information (e.g., an odometer mileage reading) associated with the vehicle for improved security. Moreover, the system provider device may determine various user device restrictions based on the transportation information and the in-vehicle location of the user, and manage the user device by applying these user device restrictions. By restricting the use of the user device when traveling in a vehicle in response to various transportation information (e.g., traffic and weather information), road safety is improved.

Figure 10:
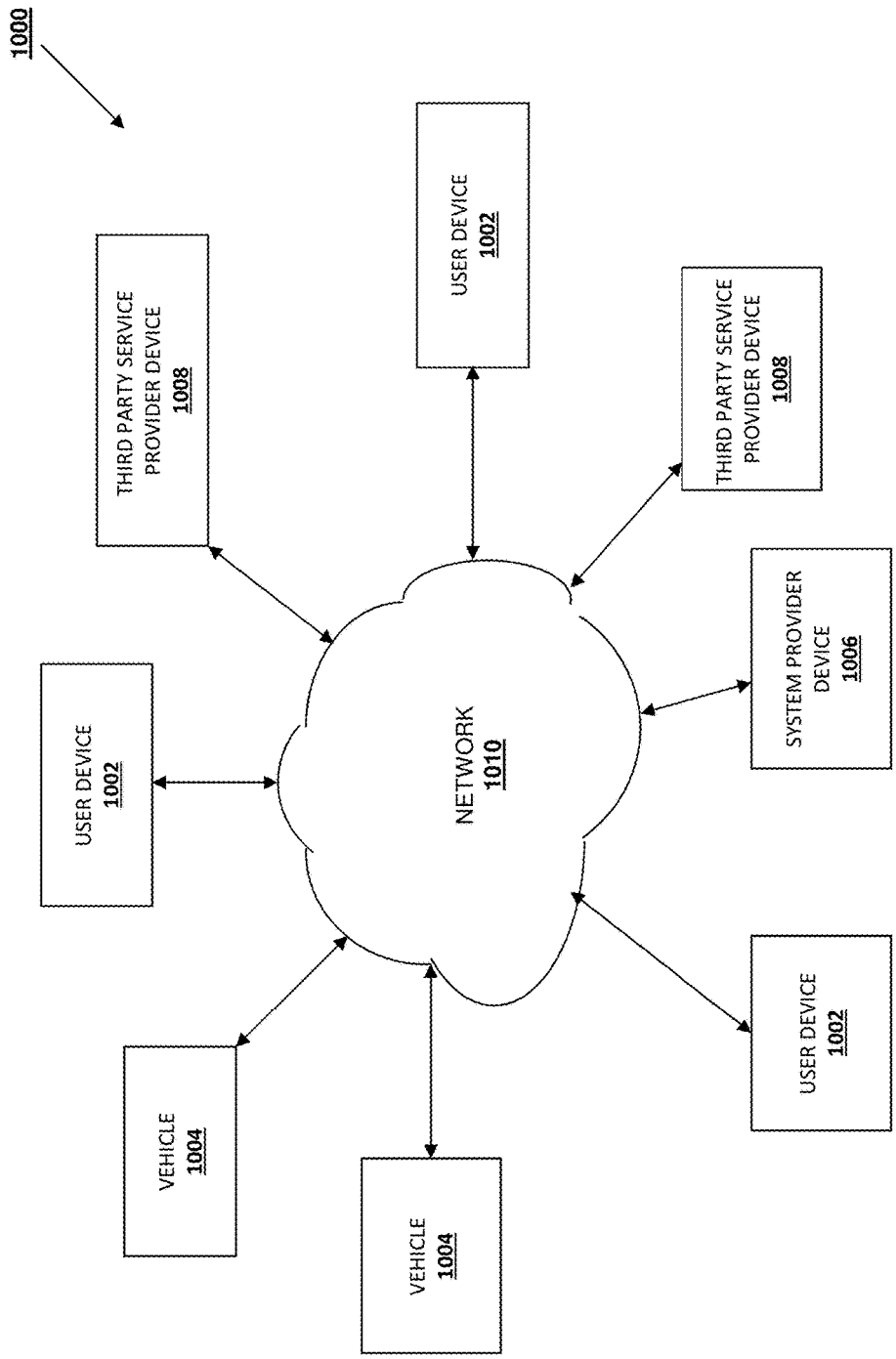
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more vehicles 1004, one or more system provider devices 1006, and one or more third party service provider devices 1008 in communication over a network 1010. Any of the user devices 1002 may be the user device 402 discussed above and used by the user discussed above. The system provider device 1006 may be the system provider device 500 discussed above and may be operated by a system provider such as, for example, PayPal Inc. of San Jose, Calif. The third party service provider device 1008 may be the service provider device discussed above and may be operated by various service providers including payment service providers, gaming service providers, travel service providers, and/or any other service providers.

The user devices 1002, vehicles 1004, system provider devices 1006, and third party service provider devices 1008 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the customer to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include a vehicle-based authentication and device management application provided by a system provider through the system provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the vehicle 1004, the system provider device 1006, and/or the third party service provider device 1008 to associate the user with a particular account as further described herein.

Figure 11:
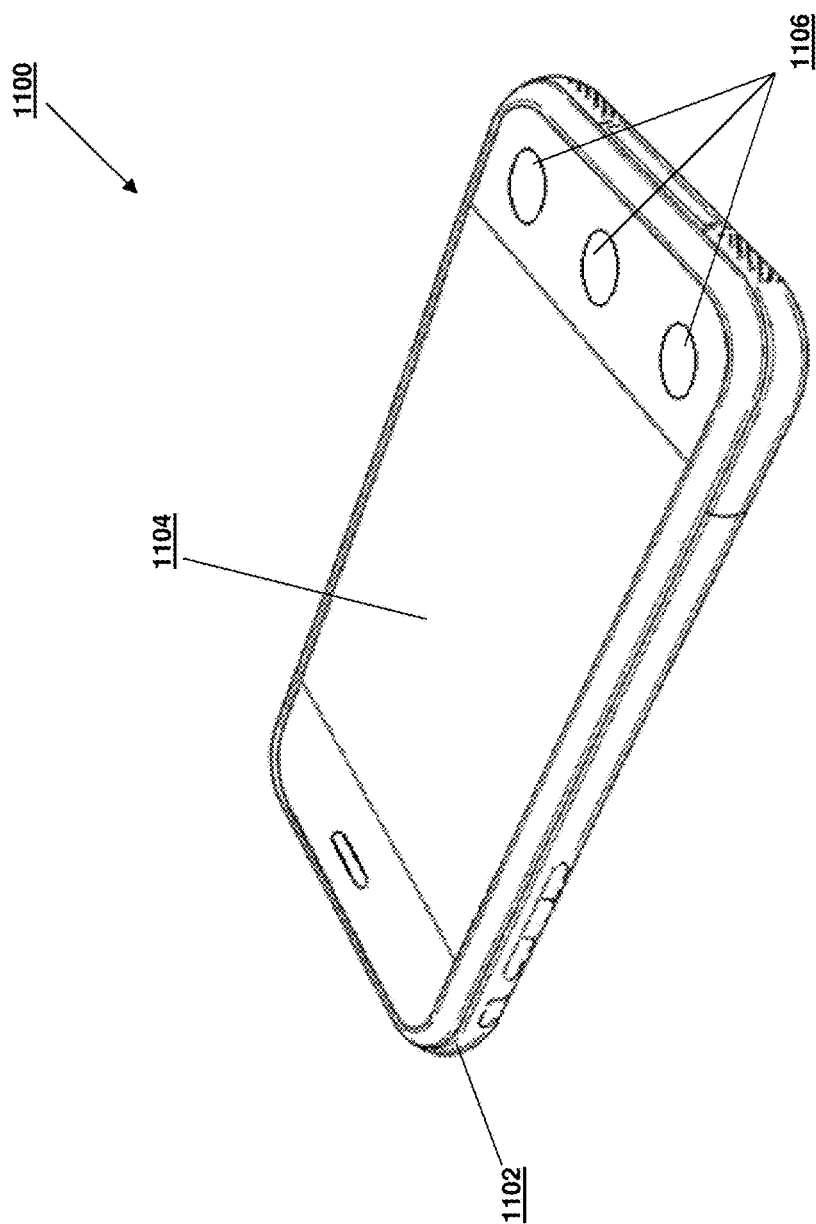
FIG. 11 is a perspective view illustrating an embodiment of a user device.

Referring now to FIG. 11, an embodiment of a user device 1100 is illustrated. The user device 1100 may be the user device 402. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the methods 100 and 800. However, a variety of other portable/mobile user devices may be used in the method 100 and 800 without departing from the scope of the present disclosure.

Figure 12:
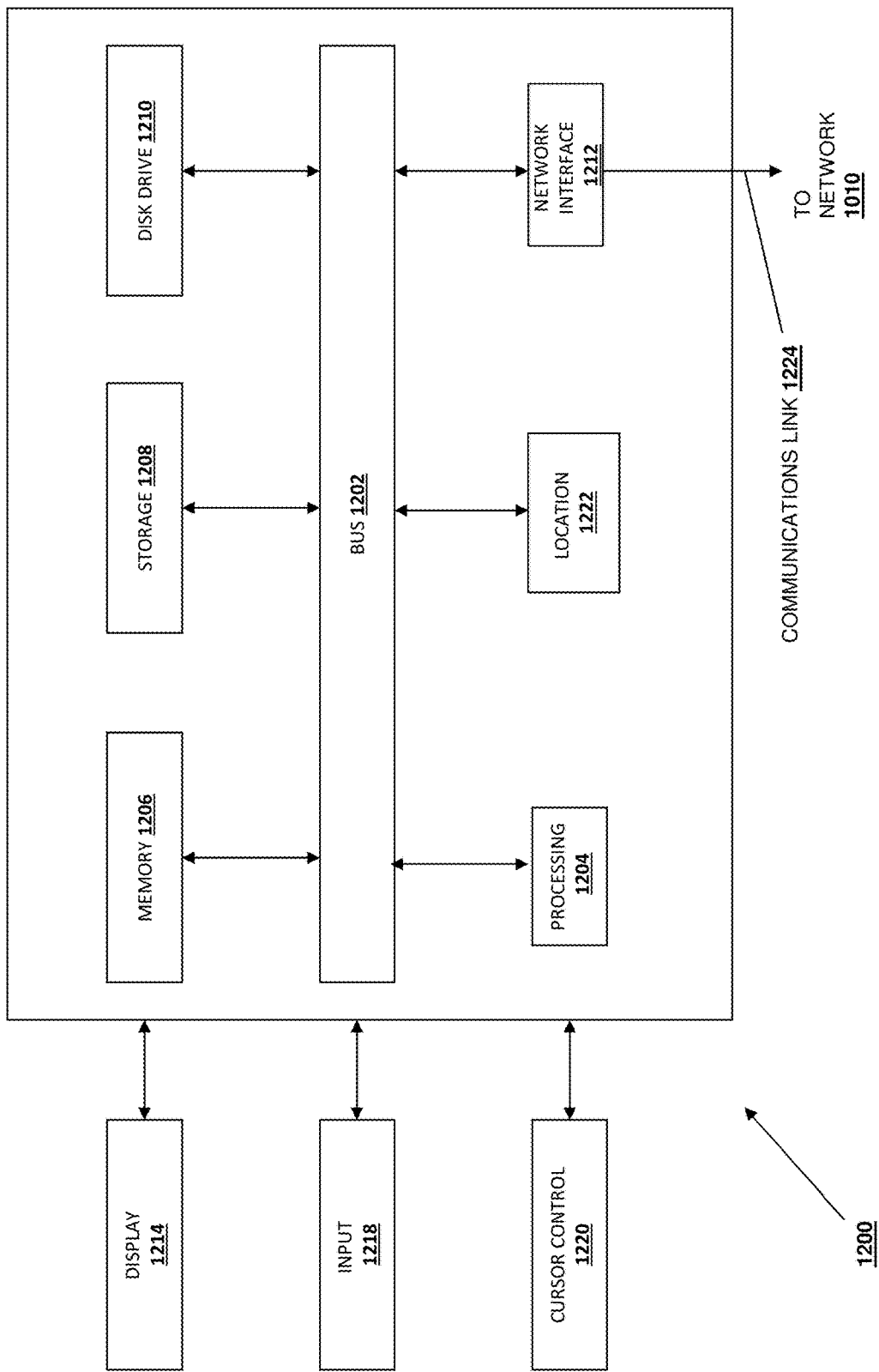
FIG. 12 is a schematic view illustrating an embodiment of a computer system.

Referring now to FIG. 12, an embodiment of a computer system 1200 suitable for implementing, for example, the computer systems of the vehicle 200, the user device 402, the system provider device 500, user devices 1002, the computer systems of vehicles 1004, system provider devices 1006, and third party service provider devices 1008, is illustrated. It should be appreciated that other devices utilized by users, payment service providers, other third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the vehicle 200, the user device 402, the system provider device 500, user devices 1002, vehicles 1004, system provider devices 1006, and third party service provider devices 1008. Such instructions may be read into the system memory component 1206 from another computer-readable medium, such as the static storage component 1208 or the disk drive component 1210. In other embodiments, hard-wired circuitry may be used in place of or in combination with software instructions to implement the present disclosure.

Logic may be encoded in a computer-readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
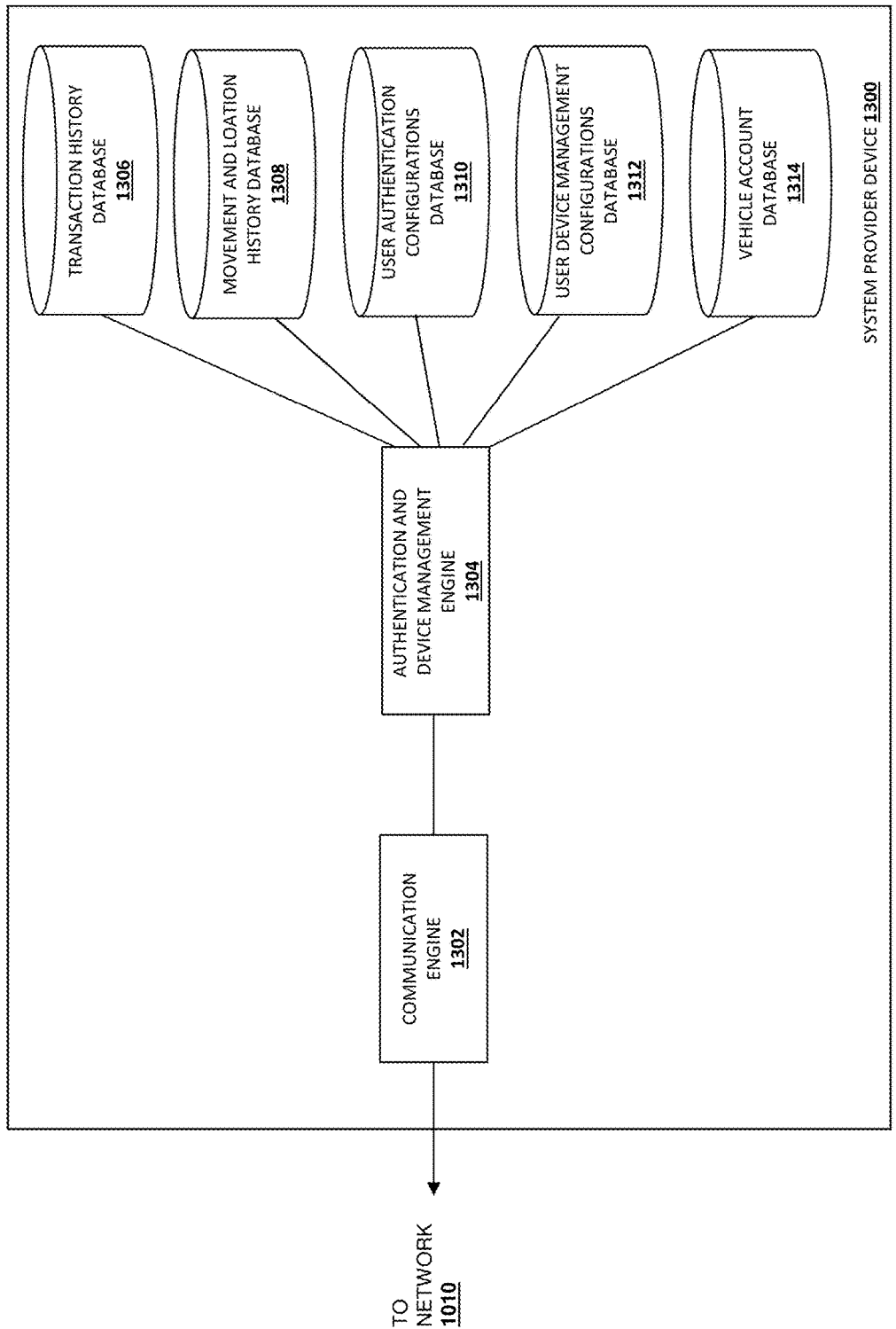
FIG. 13 is a schematic view illustrating an embodiment of a system provider device.

Referring now to FIG. 13, an embodiment of a system provider device 1300 is illustrated. In an embodiment, the system provider device 1300 may be the system provider devices 500 discussed above. The system provider device 1300 includes a communication engine 1302 that is coupled to the network 1010 and to an authentication and device management engine 1304 that is coupled to a transaction history database 1306, a movement and location history database 1308, a user authentication configurations database 1310, a user device management configurations database 1312, and a vehicle account database 1314. The communication engine 1302 may be software or instructions stored on a computer-readable medium that allows the system provider device 1300 to send and receive information over the network 1010. The authentication and device management engine 1304 may be software or instructions stored on a computer-readable medium that is operable to determine that a first user device is located within a vehicle, receiving vehicle authentication information from the vehicle, authenticating a vehicle account associated with the vehicle using the vehicle authentication information, receiving first transportation information associated with the vehicle from the vehicle, retrieving a user authentication configuration based on the vehicle account and the first transportation information, authenticating a user account of the first user for a transaction request received from the first user device based on the first transportation information according to the user authentication configuration, and provide any of the other functionality that is discussed above. While the databases 1306-1314 have been illustrated as separate from each other and located in the system provider device 1300, one of skill in the art will recognize that any or all of the databases 1306-1314 may be combined and/or may be connected to the authentication and device management engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing instructions; and
    one or more hardware processors coupled to the non-transitory memory and configured to read the instructions from the non-transitory memory to cause the system to perform operations comprising:
        determining that a first user device is located within a vehicle, wherein the first user device is associated with a first user;
        receiving, from the vehicle, vehicle authentication information;
        authenticating a vehicle account associated with the vehicle using the vehicle authentication information;
        receiving, from the vehicle, first transportation information associated with the vehicle;
        receiving, from the first user device, user authentication information including orientation information indicating an orientation direction of the first user device; and
        authenticating a user account of the first user for the first user device based on the first transportation information and the user authentication information.

2. The system of claim 1, wherein the authenticating the user account includes:
    determining, based on route information included in the first transportation information, a first route the vehicle is traveling on; and
    confirming that the first route is included in a travel routine of the first user based on a movement and location history of the first user.

3. The system of claim 1, wherein the authenticating the user account includes:
    confirming, based on route information included in the first transportation information, that the vehicle is traveling on a planned route of the first user.

4. The system of claim 1,
    wherein the authenticating the user account includes:
        determining that the first user is sitting in a first seat included in the vehicle; and
        determining that the orientation direction of the first user device corresponds to an orientation of the first seat.

5. The system of claim 1, wherein the operations further comprise:
    receiving, from the first user device, user authentication information including second transportation information associated with the vehicle;
    wherein authenticating the user account of the first user is further based on based on the second transportation information according to the user authentication information.

6. The system of claim 5, wherein the operations further comprise:
    determining that the first user is sitting in a first seat included in the vehicle;
    selecting a first display included in the vehicle based on the first seat; and
    providing the first transportation information to the first user through the first display.

7. The system of claim 5, wherein the second transportation information is provided by at least a measurement device included in the vehicle selected from a group of measurement devices consisting of a speedometer, a tachometer, an odometer, a fuel gauge, a thermostat, a hygrometer, and an altitude meter.

8. A method, comprising:
determining, by a system provider device, that a user device is located within a vehicle, wherein the user device is corresponding to a user;
receiving, by the system provider device, vehicle authentication information corresponding to the vehicle;
authenticating, by the system provider device, a vehicle account corresponding to the vehicle using the vehicle authentication information;
receiving, from the user device, user authentication information including orientation information indicating an orientation direction of the user device; and
authenticating a user account of the user for a transaction request received from the user device based on the vehicle account and the user authentication information.

9. The method of claim 8, further comprising:
communicating, from the vehicle to the user device, the vehicle authentication information using a communication device included in the vehicle, wherein the communication device uses a short-range wireless communication protocol; and
communicating, from the user device to the system provider device, the vehicle authentication information.

10. The method of claim 9, wherein the short-range wireless communication protocol includes one of a Bluetooth communication protocol, a Bluetooth Low Energy (BLE) communication protocol, a near-field communication (NFC) communication protocol, a radio frequency identification (RFID) communication protocol, or a Wi-Fi communication protocol.

11. The method of claim 9, further comprising:
communicating, from the vehicle to the user device, transportation information corresponding to the vehicle using the communication device included in the vehicle; and
receiving, by the system provider device from the user device, the transportation information;
wherein the authenticating the user account of the user includes:
determining a user authentication configuration based on the vehicle account and the transportation information; and
authenticating the user account of the user based on the transportation information according to the user authentication configuration.

12. The method of claim 11, wherein the authenticating the user account includes:
determining, based on route information included in the first transportation information, a route the vehicle is traveling on; and
confirming that the route is included in a travel routine of the user based on a movement and a location history of the user.

13. The method of claim 11, wherein the authenticating the user account includes:
confirming, based on route information included in the transportation information, that the vehicle is traveling on a planned route of the user.

14. The method of claim 8,
wherein the authenticating the user account includes:
determining that the user is sitting in a seat included in the vehicle; and
determining that the orientation direction of the user device corresponds to an orientation of the seat.

15. A method, comprising:
determining, by a system provider device, that a user device is located within a vehicle, wherein the user device is associated with a user;
receiving, by the system provider device, vehicle authentication information associated with the vehicle;
authenticating, by the system provider device, a vehicle account associated with the vehicle using the vehicle authentication information;
determining a trust level associated with the vehicle account based on a vehicle type of the vehicle, registered user information associated with the vehicle, or a past transaction associated with the vehicle;
receiving, by the system provider device from the user device, first transportation information associated with the vehicle;
determining, by the system provider device, a user authentication configuration based on the vehicle account and the first transportation information; and
authenticating, by the system provider device, a user account of the user for a transaction request received from the user device based on the trust level and the user authentication configuration.

16. The method of claim 15, wherein the vehicle authentication information is received from the vehicle via the user device.

17. The method of claim 15, wherein the first transportation information associated with the vehicle was received by the user device from the vehicle using a communication device included in the vehicle.

18. The method of claim 15, wherein the authenticating the user account includes:
determining, based on route information included in the first transportation information, a route the vehicle is traveling on; and
confirming that the route is included in a travel routine of the user based on a movement and location history of the user.

19. The method of claim 15, further comprising:
receiving second transportation information associated with the vehicle;
determining a user device restriction based on the second transportation information; and
sending, to the user device, a notification that causes a user device action to be performed on the user device to apply the user device restriction on the user device.

20. The method of claim 15, further comprising:
receiving, from the user device, user authentication information including orientation information indicating an orientation direction of the user device,
wherein the authenticating the user account includes:
determining that the user is sitting in a seat included in the vehicle; and
determining that the orientation direction of the user device corresponds to an orientation of the seat.

* * * * *